Sept. 17, 1935.  H. C. EDWARDS  2,014,838
BALANCING FIXTURE
Filed March 20, 1931   2 Sheets-Sheet 1
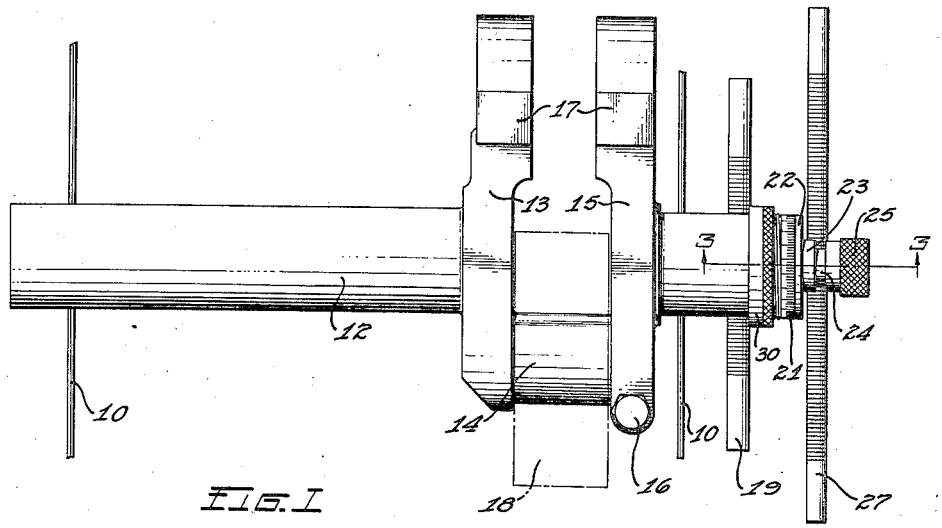
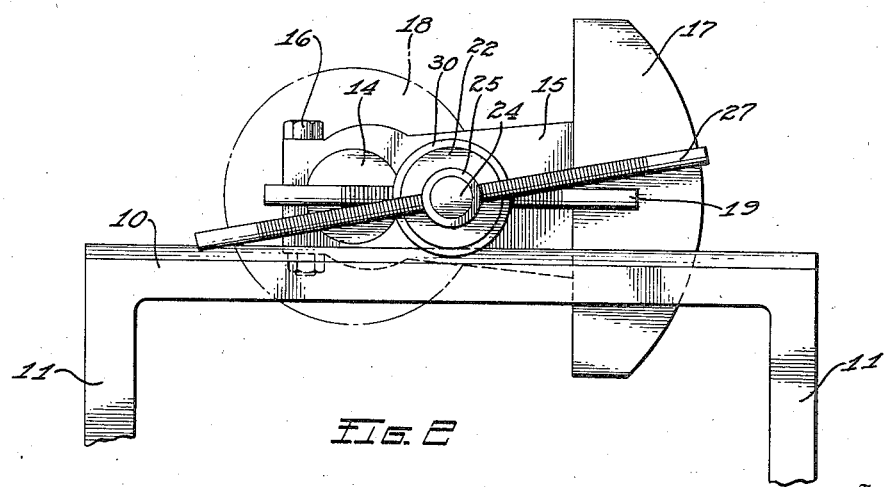
Inventor
HERBERT C. EDWARDS.
By
Attorney

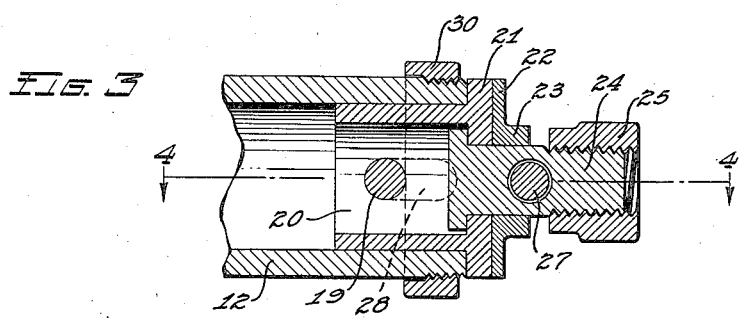
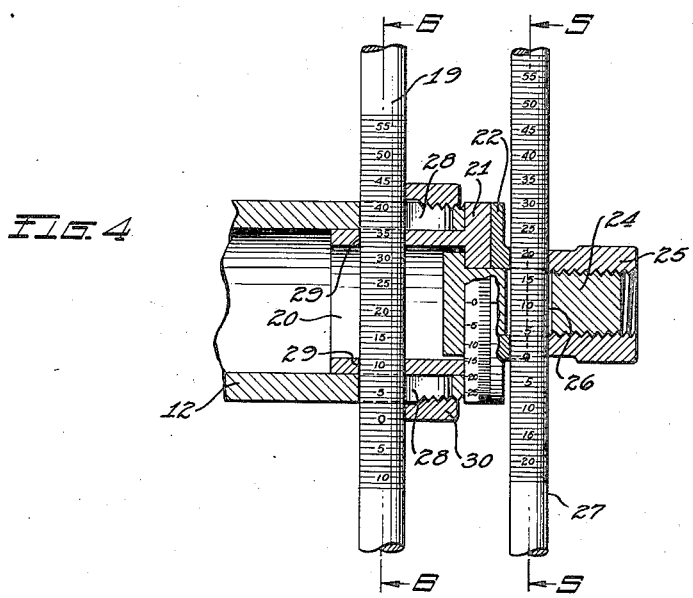
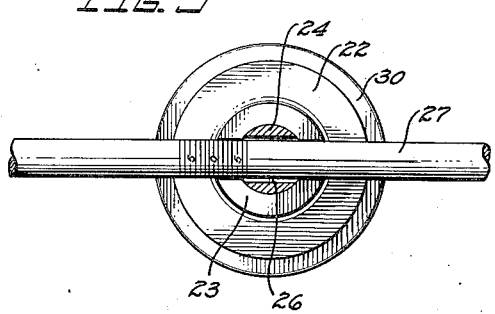
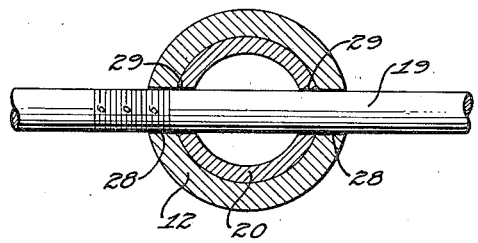
Inventor
HERBERT C. EDWARDS.

Patented Sept. 17, 1935

2,014,838

UNITED STATES PATENT OFFICE 2,014,838

BALANCING FIXTURE

Herbert C. Edwards, Detroit, Mich., assignor to Packard Motor Car Company, Detroit, Mich., a corporation of Michigan Application March 20, 1931, Serial No. 524,204

6 Claims. (Cl. 73—51)

This invention relates to balancing fixtures and more particularly to fixtures for statically balancing rotating devices.

Fixtures are now employed by means of which the out of balance of crank shafts in weight and angle can be determined within certain tolerances. In such devices a ring member is applied to the crank shaft, whereupon the amount of weight which must be taken from or added to the counterweights and the angle thereof can be determined through indicating mechanism from which the same can be calculated. With a single throw crank shaft, such as used with a radial engine, the weight of such member is calculated to be the equivalent of one-half the weight of the reciprocating parts plus the entire weight of the rotating parts connected to the crank pin. In a radial engine the reciprocating parts include the pistons, piston pins, piston rings and the upper end of the connecting rods, while the rotating parts include the lower end of the connecting rods, the master rod hub and the pins connecting the rods with the hub.

Theoretically, the weight of the applied ring member can be accurately calculated for a given design of engine, but due to manufacturing inaccuracies the weight of the engine parts, above enumerated, vary and the ring weight is determined generally by the average weight of a plurality of the several parts for several engines. As a result, the ring weight will be a compromise in balancing the crank shafts of similar engines so that generally the static balance of crank shafts calculated in the above manner is seldom accurately obtained.

In many instances static balance of the character above described may be satisfactory, but precision balancing is most desirable.

An object of the invention is to provide apparatus by means of which a single throw counterweighted crank shaft can be balanced statically so that the effect of the engine parts associated with the crank pin are exactly compensated for.

Another object of the invention is to provide fixture mechanism which can be applied to a single throw crank shaft preparatory to balancing it statically, whereby the effect of the reciprocating and rotating engine parts to be associated with the crank throw are precisely compensated for.

Other objects of the invention will appear from the following description taken in connection with the drawings, which form a part of this specification, and in which:

Fig. 1 is a plan view of a fixture incorporating my invention with a crank shaft associated therewith;

Fig. 2 is an end view of the same;

Fig. 3 is a fragmentary sectional view taken on line 3—3 of Fig. 1;

Fig. 4 is another fragmentary sectional view taken on line 4—4 of Fig. 3;

Fig. 5 is a sectional view taken on line 5—5 of Fig. 4;

Fig. 6 is a sectional view taken on line 6—6 of Fig. 4.

Referring now to the drawings by characters of reference, 10 indicates a pair of spaced parallel shaft supporting members which are arranged in a horizontal plane and are carried by legs 11 extending upwardly from a suitable base (not shown). The base is of such a character that the shaft supporting members can be set level and in a plane thereabove for the convenience of the operator.

The crank shaft 12 to be balanced, which is of a single throw type for a radial engine, is placed upon the supporting members 10 to be tested for static balance. The crank shaft illustrated is formed in two sections, one of which includes the arm 13 and the crank pin 14 and the other of which includes the arm 15. The arm 15 is bifurcated at one end and is clamped to the crank pin by suitable detachable means, such as the bolt 16. Counterweights 17 are fixed to the ends of the arms remote from the crank pin.

In order to balance the crank shaft under its operating conditions prior to assembly with the engine, it is necessary that a weight be associated with the crank pin which has the same effect thereupon statically as the rotating and reciprocating engine parts which are connected to the crank pin, and the ring member 18 is applied to the crank pin for this purpose while the arm 15 is detached. The weight of this ring is calculated to be the equivalent of one half that of the reciprocating parts, including the pistons, piston pins, piston rings and the outer sections of the connecting rods plus the weight of the rotating parts which include the master rod hub, the inner sections of the connecting rods and the pins connecting the rods with the master rod hub. For any given design of engine the weight of these engine parts can be theoretically calculated, but due to manufacturing inaccuracies the weight of such parts in each engine varies to some extent and, therefore, the ring is generally off weight. Ordinarily, the ring weight is determined by the average weight of the parts taken from several engines, as above related, but even so their variance prohibits the ring weight being accurate in most instances and, therefore, when a ring of average weight is utilized for a certain engine design, the static balance of the engine is inaccurate. In many instances this inaccuracy of engine balance is immaterial, but in other instances it is most desirable that the static balance of the engine be accurate. In order to more closely approach accuracy a plurality of rings of different weights is sometimes supplied with fixtures of this type so that resulting unbalance of engines will thereby be considerably reduced over those present when a single average ring weight is employed, but the carrying of a plurality of ring weights is not desirable and, furthermore, it is substantially impossible to have sufficient rings of different weights to meet all of the different weight conditions encountered with various crank shafts and their associated parts.

It is the purpose of this invention to associate with the crank shaft and the fixture an adjustable compensating means for use with a ring of average weight or its equivalent, whereby any given weight of the engine parts associated with the crank pin can be accurately provided for so that the out of balance of the crank shaft can be precisely determined and corrected. Such means consists in this instance of a compensating bar 19 which is adjustably associated with the crank shaft. The manner of adjusting this compensating bar to suit different conditions will be hereinafter described.

In order to calculate the location on the counterweights and the weight which should be added or removed therefrom in order to statically balance the crank shaft, I employ mechanism which I will now describe. This mechanism includes a sleeve 20, adapted to telescope within the hollow end of the crank shaft, which terminates in a circular flange 21 the peripheral face of which is graduated. Adjacent this dial flange 21 is an indicator plate 22 having a sleeve portion 23 formed with oppositely disposed semi-circular recesses in its end wall. A clamp bolt 24 extends through the sleeve 23 and the enlarged end thereof bears against the inner face of the dial flange within the sleeve 20 and a nut 25 is screwed upon the end of the bolt. The clamp bolt is provided with a transversely extending opening 26 and a balancing bar 27 extends through such opening and within the recesses in the end of the flange 23. When the parts just described are associated, the nut 25 is screwed against the balancing bar to engage the same against the sleeve 23 and such assembly is then ready to be associated with a crank shaft. Upon insertion of the sleeve 20 into the end of the crank shaft, the compensating bar 19 is inserted through oppositely disposed slots 28 in the hollow crank shaft and through oppositely disposed openings 29 in the sleeve 20. The end of the shaft is threaded and a nut 30 is arranged thereon and is adapted to press the compensating bar against the wall of the crank shaft forming one end of the slots 28. Various types of fixtures, including different types of balancing means, can be employed and the means for compensating for differences between the weight of the ring 18 and the parts connected to the crank pin can be associated therewith without departing from the spirit of the invention.

The mechanism which is applied to the crank shaft, with the exception of the nut 30 and the compensating bar 19, includes protractor means for determining the angle on the counterweights at which weight should be added or removed in order to statically balance the same, and the balancing bar 27 is adjusted to determine the amount of weight which should be added or taken from the crank shaft. The dial 21 is graduated around its periphery in degrees of a circle, and the plate 22 is provided on its periphery with a single graduation. By turning the nut 25 which carries with it the plate 22 and the bar 27, the registration of the single graduation on the plate 22 relative to the graduations on the dial 21 will indicate angularly the number of degrees the crank shaft is out of balance and at the same time by moving the bar 27 axially, it will indicate by graduations thereon the amount of out of balance. The sleeve 20 is held against rotation by the bar 19, and the nut 25 is adjusted to frictionally hold the bar 27 and the plate 22 in adjusted position and at the same time allow adjustment thereof. The bar is moved in the direction of its axis and angularly of the axis of the mass until the static balance of the shaft results. The amount of out of balance of the engine can be readily determined by the axial adjustment of the bar from its normal center of gravity relation suitably indicated by the graduations thereon.

The compensating bar 19 is preferably formed so that it weighs one pound, and suitable graduations are marked lengthwise thereon. As shown in Fig. 4, these graduations are placed on the bar so that when zero graduation coincides with the periphery of the nut 30, then the center of gravity of the bar coincides with that of the crank shaft and, consequently, the center of gravity of this bar is a little more than the graduation number twenty. The bar is marked so that the graduations are one-sixteenth of an inch apart and, consequently, will exert a force of one pound at a one-sixteenth radius so that each graduation on the bar can be referred to as an inch ounce, that is, 1 lb.×$\frac{1}{16}$ inch radius=$\frac{1}{16}$ inch lb. or 1 inch ounce.

When the parts connected to the crank pin, as previously designated, are different in weight from that of the compensating ring 18, then the bar 19 is moved axially to compensate for such difference. For example, if the ring weight is sixteen ounces heavier than one-half of the weight of the reciprocating parts plus the entire weight of the rotating parts connected to the crank pin at a three inch radius, then the bar should be moved in a direction away from the ring weight forty-eight inch ounces so that graduation number forty-eight coincides with the periphery of the nut. After adding or removing weight from the counterweights, as determined by the adjustment of the bar 27, rolling the shaft on the supporting members 12 will determine whether it is in static balance.

It will be seen that with the weight compensating means herein described, crank shafts can be readily made to be in static balance with the use of a single compensating weight attachment.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In means for preparing quantity production crank shafts for static balance in which a mass is applied to a crank, such mass being the average weight for the engine parts connected with a similar crank of a plurality of shafts, means for accurately compensating for variations between the actual weight of the parts connected with each crank comprising a scaled bar adjustable axially transversely through the crank shaft, and adjustable means removably engaging said shaft for clamping said bar in adjusted position with the shaft during static balancing operations.

2. A fixture for statically balancing a crank shaft having a hollow end comprising a sleeve extending into and secured to the hollow end of the crank shaft, a dial flange on the end of the sleeve exteriorly of the crank shaft having graduations on its periphery to indicate crank shaft angularity, an indicator coaxial with the dial flange, means carried by the sleeve for supporting said indicator, and a balancing bar extending transversely of the crank shaft and carried by the dial supporting means.

3. A fixture for statically balancing a crank shaft having a hollow end comprising a sleeve extending into and secured to the hollow end of the crank shaft, a dial flange on the end of the sleeve exteriorly of the crank shaft having graduations on its periphery to indicate crank shaft angularity, an indicator coaxial with the dial flange, means rotatably carried by the sleeve on which the indicator is fixed, and weight means carried by said rotatable means and adjustable normal to the crank shaft axis.

4. A fixture for statically balancing a crank shaft having a hollow end comprising a sleeve extending into and fixed to the hollow end of the crank shaft, a member rotatably carried by the sleeve and extending beyond the end of the crank shaft, and a weight balancing bar carried by the rotatable member, said balancing bar extending normal to the axis of the crank shaft and being axially adjustable.

5. A fixture for statically balancing a crank shaft with a hollow end comprising a sleeve extending into and secured to the hollow end of the crank shaft, a dial flange on the end of the sleeve exteriorly of the crank shaft having graduations on its periphery to indicate crank shaft angularity, an indicator coaxial with the dial flange, mounting means rotatably carried by the sleeve and extending axially through the indicator, a weight balancing bar extending transversely through the mounting member and engageable with the indicator, and means on the mounting member for securing the balancing bar with the indicator.

6. In means for preparing quantity production crank shafts for static balance in which a mass is applied to a crank, said mass having an average weight of the engine parts connected with a similar crank of a plurality of shafts, means for accurately compensating for variations between the mass and the actual weight of the parts connected with each crank comprising a sleeve extending into the end of the crank shaft, a compensating bar extending through the sleeve and the crank shaft normal to the axes thereof, said bar being adjustable axially to compensate for the difference in weight between the mass and the actual parts which are connected to the crank, and means associated with the crank shaft for clamping the bar in fixed relation axially of the crank shaft.

HERBERT C. EDWARDS.